United States Patent [19]

Pittie et al.

[11] 3,997,337
[45] Dec. 14, 1976

[54] SEPARATION AND/OR PURIFICATION OF PRECIOUS METALS

[75] Inventors: Willem H. Pittie, Rooderpoort, Transvaal; Gerhardus Overbeek, Florida, Transvaal, both of South Africa

[73] Assignee: Swarsab Mining, Exploration & Development Company (Proprietary) Limited, Johannesburg, South Africa

[22] Filed: Aug. 29, 1975

[21] Appl. No.: 609,155

[30] Foreign Application Priority Data

Apr. 3, 1975 South Africa ............... 75/2093

[52] U.S. Cl. ........................... 75/121; 75/108; 423/22; 423/44; 423/88; 423/97; 423/508; 423/593
[51] Int. Cl.² ................................. C22B 11/00
[58] Field of Search ............... 75/121, 83, 108; 423/22, 44, 88, 97, 508, 593

[56] References Cited

UNITED STATES PATENTS 3,413,114  11/1968  Illis et al. ............... 75/83 X

Primary Examiner—M. J. Andrews
Attorney, Agent, or Firm—Cushman, Darby & Cushman

[57] ABSTRACT

A process for the treatment of a concentrate of by-metals comprises heating the concentrate at between 1100° C and 1500° C, preferably at about 1300° C, in a gaseous stream which comprises oxygen. The heating step is effected for a period of time sufficient to ensure quantitative removal of one or more of lead, arsenic, silver, bismuth and/or tellurium and the oxidation of ruthenium, rhodium and iridium to their oxides.

9 Claims, 1 Drawing Figure

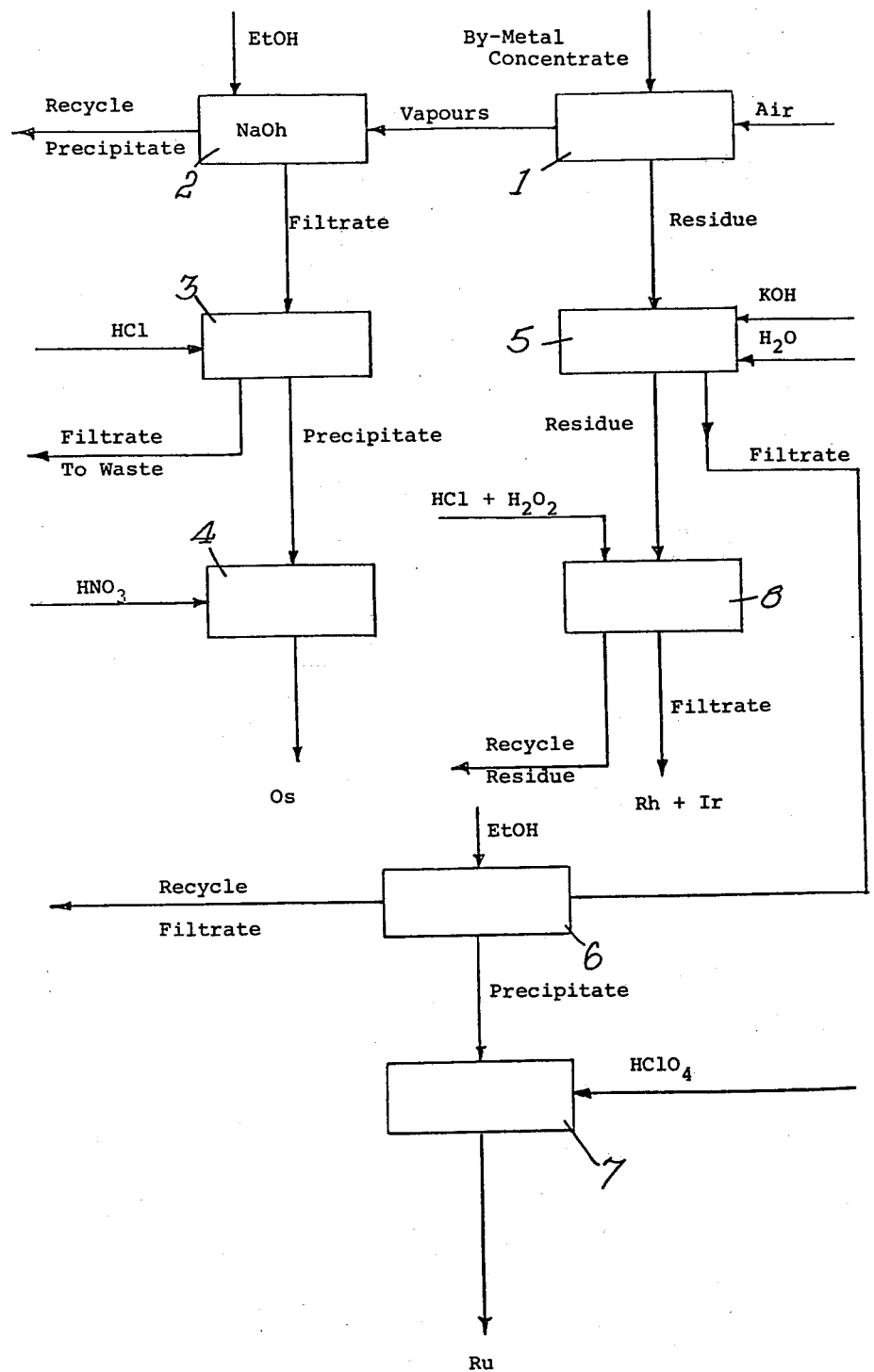

SEPARATION AND/OR PURIFICATION OF PRECIOUS METALS

BACKGROUND OF THE INVENTION

This invention relates to the separation and purification of precious metals which consist, in the context of this specification, of the platinum group metals and gold. More particularly the invention is concerned with the separation and/or purification of what are commonly termed secondary platinum group metals or by-metals, which consist of rhodium, ruthenium, iridium and osmium.

In all processes within applicants's knowledge a precious metal concentrate is initially split into two groups, one of which consists basically of platinum, palladium and gold, and the other of which comprises the by-metals. In one known process the by-metals are alloyed with lead to separate a substantial amount of base metals therefrom initially. ("Base metals" in the context of this specification include all metals apart from precious metals and silver). Lead is then dissolved using dilute nitric acid and platinum, palladium and gold are dissolved by means of aqua regia.

The resultant reside constitutes a feed to a by-metal separations and purification stage of the whole process. As an example of the type of concentrate which may be obtained from the above process steps, the following is given by way of illustration with the relative proportions of the metals being given in weight percentages:

| ELEMENT | | PERCENT |
|---|---|---|
| Platinum | (Pt) | 1 – 5 |
| Palladium | (Pd) | 1 – 3 |
| Gold | (Au) | 0,1 – 0,5 |
| Rhodium | (Rh) | 5 – 15 |
| Ruthenium | (Ru) | 30 – 50 |
| Iridium | (Ir) | 4 – 10 |
| Osmium | (Os) | 0 – 5 |
| Silver | (Ag) | 2 – 5 |
| Copper | (Cu) | 0 – 4 |
| Nickel | (Ni) | 0 – 4 |
| Iron | (Fe) | 0 – 1 |
| Lead | (Pb) | 20 – 50 |
| Tellurium | (Te) | 0 – 1 |
| Bismuth | (Bi) | 0 – 0,5 |
| Arsenic | (As) | 0 – 0,5 |

Such a by-metal concentrate may be fused with potassium bisulphate ($KHSO_4$) which renders the rhodium water soluble by converting it to the sulphate, $Rh_2(SO_4)_3$.

After water treatment to remove rhodium, the residue is separated from the dissolved rhodium and subjected to a sodium peroxide ($Na_2O_2$) fusion which converts the ruthenium and osmium to water soluble sodium salts of the oxo-anions of the two metals (e.g. $RuO_4^{2-}$ and $OsO_4^{2-}$ respectively) and iridium to an acid soluble hydrous oxide probably $IrO_2.nH_2O$. The ruthenium and osmium are then separated from the iridium by treating the sodium peroxide melt with water followed by filtration while the iridium is dissolved by treating the resultant residue with hydrochloric acid.

The metals thus separated from one another are then treated for further purification. The ruthenium and osmium are normally purified by a collective chlorine distillation, followed by a nitric acid distillation for osmium. The rhodium is treated for the removal of impurities such as palladium, tellurium and other base metals which are also rendered soluble by the $KHSO_4$ fusion. The iridium has to be separated from large quantities of lead and other impurities present in the concentrate which have been rendered soluble by the sodium peroxide ($Na_2O_2$) fusion.

The above process is often carried out on what applicant considers to be unecessarily large quantities of concentrates thereby using correspondingly large quantities of costly reagents. Also, the impurities, in particular tellurium are sometimes difficult to remove.

SUMMARY OF THE INVENTION

It is the object of this invention to provide a process for the treatment of a by-metal concentrate which will assist in the removal of troublesome impurities such as Te, As, Bi, Ag, and Pb which will remove osmium, and which will reduce the bulk of the by-metals being refined with a consequent saving of reagents and cost of equipment.

In accordance with this invention, there is provided a process for the treatment of a concentrate of by-metals comprising the heating of the concentrate at between about 1100° C and 1500° C in a gaseous stream which comprises oxygen, the heating being effected for a period of time sufficient to ensure quantitative removal of one or more of lead, arsenic, silver, bismuth and/or tellurium and the oxidation of ruthenium, rhodium and iridium to their oxides.

Further features of the invention provide for the gaseous stream to be air, for the gaseous stream to be scrubbed after leaving the heating region, for the scrubbing liquid to be treated for the recovery of osmium, and for the heating to be effected at about 1300° C.

The invention also provides a method of treating the ignited by-metal concentrate for the separation of ruthenium from the other platinum group metals therein, comprising fusing the ignited concentrate with potassium hydroxide and leaching the melt with water to dissolve ruthenium complexes formed in the fusion process.

Further features of this aspect of the invention provide for the residue obtained after the water leach to be treated for the dissolution of the platinum group metals by the action of hydrochloric acid, and hydrogen peroxide with the reactants being placed in a suitable bomb and heated to a moderate temperature, for example, about 150° C.

DETAILED DESCRIPTION OF THE INVENTION

In its preferred form the invention is implemented basically as follows, the process steps being clearly shown in the accompanying flow sheet:

A by-metal concentrate is heated at 1 in a stream of air at about 1300° C for 20 hours.

It has been found that under these conditions osmium is removed quantitatively from the concentrate together with lead, arsenic, silver bismuth and tellurium, while less than 10% of the ruthenium and only traces of the other PGMs are volatilized. The vapours are scrubbed at 2 with a 10% NaOH solution which precipitates all the metals as hydrous oxides (which settle to the bottom of the receiving vessel) except the ruthenium and osmium oxides which are converted to soluble sodium salts according to the following reactions:

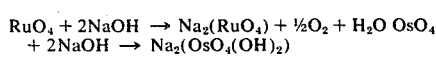

The ruthenium is precipitated at 2 from the alkali solution by the addition of ethanol which reduces the oxo-anion $RuO_4^{2-}$ to an insoluble hydrous oxide which is probably $Ru_2O_3 \cdot nH_2O$. This precipitate is filtered off together with the sludge in the receiver which contains the other metals which have been volatized and is recycled to the lead alloying stage of the metal process or to some other convenient point of lead alloying is not utilized.

The osmium which remains in solution is then precipitated at 3 at room temperature as a hydrous oxide, probably $Os_2O_3 \cdot nH_2O$ by acidifying the solution with HCl to a pH = 4,0

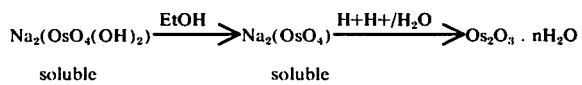

The osmium thus obtained may be purified by redissolution at 4 in $HNO_3$ and subsequent distillation.

It is considered that the above mentioned temperature of 1300° C is important since if the temperature is too high, too much ruthenium is lost and if it is too low the reaction rate is too slow.

The furnace calcine which contains the rhodium, iridium and in excess of 90% of the ruthenium (largely as the dioxide $RuO_2$) is fused with KOH at 700° C for 90 minutes to form a water soluble salt of ruthenium $K_2(RuO_4)$.

The ruthenate formed is leached with water while the other PGMs remin insoluble, and are separated from the ruthenium by filtration. As the ruthenate is very readily reduced by organic matter, this filtration is carried out on a sintered glass disc and not on filter paper. Ruthenium in the filtrate is then precipitated as a hydrous oxide ($Ru_2O_3 \cdot nH_2O$) at room temperature by the addition at 6 of alcohol. The ruthenium thus obtained generally contains some base metals (such as Fe, Cu and Ni) from which it may be purified by dissolution at 7 in $HClO_4$ and subsequent distillation.

The rhodium and iridium remaining insoluble after the KOH fusion can be brought into solution by HCl plus $H_2O_2$ under pressure in a bomb or auto-clave at 8 etc. The rhodium and iridium thus dissolved may then be purified more readily by conventional methods since the bulk of the interfering elements such as Pb, As, Te, Bi and Ag are absent at this stage due to high temperature roasting of the concentrate.

The advantages of the invention above described are therefore as follows:

a. The bulk of interfering elements (such as Pb, As, Bi, Te, Ag etc.) are removed in a single step namely the roasting step thereby greatly simplifying the subsequent purification procedure of the PGMs.

b. The quantity of material to be treated for the separation of the by-metals is greatly reduced thereby contributing to a decrease in the cost of refining of the metals since less reagents labour and equipment is required.

c. The invention provides a process for the separation and purification of ruthenium and osmium other than the presently used process which takes a long time to complete and also involves many separate steps of different kinds.

d. As a result of the conversion of the ruthenium to its dioxide ($RuO_2$) during the ignition, the conventional corrosive $Na_2O_2$ sintering can be replaced by a KOH-fusion. This technique has been found to give superior results. Also the cost and corrosiveness of KOH are far less than that of $Na_2O_2$.

e. Due to the KOH-fusion the iridium- and rhodium oxides present in the residue are found to be almost quantitatively soluble in HCl + $H_2O_2$ at 150° C in the subsequent bomb dissolution.

EXAMPLE OF THE INVENTION

STEP 1

100g of a by-metal concentrate (an analysis of which is given in table I) was roasted in a stream of air at 1300° C for 20 hours.

TABLE I

ANALYSIS OF BY-METAL CONCENTRATE

| Element | (In % by weight) % (By weight) | Weight grams |
|---|---|---|
| Os | 3,8 | 3,8 |
| Pt | 3,0 | 3,0 |
| Pd | 0.8 | 0,8 |
| Au | 0,3 | 0,3 |
| Rh | 6,3 | 6,3 |
| Ru | 40,8 | 40,8 |
| Ir | 5,1 | 5,1 |
| Ag | 2,3 | 2,3 |
| Pb | 32,0 | 32,0 |
| Te | 0,5 | 0,5 |
| As | 0,1 | 0,1 |
| Bi | 0,1 | 0,1 |
| Others (by difference) | 4,9 | 4,9 |

Air was drawn over the concentrates by suction through two receiving vessels containing aqueous NaOH (10% w/v) solution arranged in series.

The contents of the receiving vessels were then fed to the osmium recovery circuit.

The furnace calcine residue (an analysis of which is given in table II) weighed 68,0 g. (i.e. weight loss = 32%)

TABLE II

ANALYSIS OF CALCINE RESIDUE

| Element | (% by weight) % by weight | g |
|---|---|---|
| Os | Trace | — |
| Pt | 4,4 | 3,0 |
| Pd | 1,2 | 0.8 |
| Au | 0,4 | 0,3 |
| Rh | 9,2 | 6,3 |
| Ru | 55,5 | 37,7 |
| Ir | 7,4 | 5,0 |
| Ag | — | |
| Pb | — | |
| Te | — | |
| As | — | |
| Bi | T | |
| Oxygen and others (by difference) | 21,9 | 14,9 |

STEP 2

The calcine residue was then fused with five times its own weight (350g) of KOH in a stainless steel crucible at 700° C for 90 minutes. The melt was poured into an iron dish and allowed to solidify. The solidified melt was then broken up and leached with water at room temperature. The resulting solution was then filtered through a sintered glass disc.

The filtrate (which contained 87,5% of the ruthenium originally present in the by-metal concentrate) was fed to the ruthenium recovery circuit.

The leach residue (an analysis of which is given in table II) weighed 20,5 g (i.e. weight loss in % of original = 79,5%).

TABLE III

ANALYSIS OF LEACH RESIDUE

| Element | (% by weight) % (by weight) | g |
|---|---|---|
| Pt | 14,6 | 3,0 |
| Pd | 3,9 | 0,8 |
| Au | 1,5 | 0,3 |
| Rh | 30,7 | 6,3 |
| Ru | 9,7 | 2,0 |
| Ir | 24,4 | 5,0 |
| Oxygen and others by by difference | 15,2 | 3,1 |

STEP 3

The leach residue was charged into a Teflon bomb together with 160ml (36% w/v) HCl and 10 ml (100 Vol) $H_2O_2$. The bomb was then rotated in an oven at 150° C and the reaction allowed to proceed for 4 hours. The contents of the bomb were then allowed to cool to room temperature and filtered, the residue obtained weighed 1,2g. (An analysis of the residue is given in table IV). The residue was recycled to the lead fusion step and the filtrate obtained (which contained 95% of the Rh and Ir originally in the by-metal concentrate) was treated for the separation of rhodium and iridium according to the precedure as set out in our

TABLE IV

ANALYSIS OF THE BOMB DISSOLUTION RESIDUE

| Element | % (By weight) | g |
|---|---|---|
| Pt | 16,7 | 0,2 |
| Pd | 25,0 | 0,3 |
| Au | 8,3 | 0,1 |
| Rh | 8,3 | 0,1 |
| Ru | 8,3 | 0,1 |
| Ir | 8,3 | 0,1 |
| Others (by difference) | 25,0 | 0,3 |

OSMIUM RECOVERY CYCLE

To the NaOH receiving solutions 3 ml of ethanol (95%) were added (at room temperature) and the solution filtered under vacuum. The residue - precipitate (an analysis of which is given in table V) weighed 43,0 g and was recycled to the lead collection stage.

TABLE V

ANALYSIS OF THE RESIDUE-PRECIPITATE

| ELEMENT | % (By weight) | g |
|---|---|---|
| Pt | — | — |
| Pd | — | — |
| Au | — | — |
| Rh | — | — |
| Ru | 7,2 | 3,1 |
| Ir | 0,2 | 0,1 |
| Os | — | — |
| Ag | 5,4 | 2,3 |
| Pb | 74,4 | 32,0 |
| Te | 1,2 | 0,5 |
| As | 0,2 | 0,1 |
| Bi | 0,2 | 0,1 |
| Oxygen and others (by difference) | 11,8 | 4,8 |

The filtrate which contained in excess of 98% of the osmium in the concentrate was then acidified with hydrochloric acid to pH 4,0 and the solution allowed to stand over night. The osmium hydrous oxide precipitate obtained was then filtered off and the filtrate discarded.

The osmium (3,7 g) obtained in this manner contained traces only of the other precious metals and as the hydrous oxide it is in a very suitable form for final purification. (i.e. dissolution in $HNO_3$ and subsequent distillation as $OsO_4$)

RUTHENIUM RECOVERY CYCLE

Ruthenium (35,7 g) in the KOH- leach filtrate was then precipitated as the hydrous oxide, $Ru_2O_3nH_2O$ at room temperature with 20 ml ethanol (95%). The solution was filtered and precious metals contained in the filtrate precipitated with $H_2S$ and recycled to the high temperature ignition step (i.e. Step 2).

The $Ru_2O_3nH_2O$ obtained in this manner contained traces only of other PGMs and as the hydrous oxide it is in a very suitable form for final purification (i.e. dissolution in $HClO_4$ followed by distillation as $RuO_4$).

The invention therefore provides a simplified and economic process for the separation and purification of by-metals which, it is considered, is superior to the currently used processes.

What we claim as new and desire to secure by Letters Patent is:

1. A process for the recovery of rhodium, ruthenium, iridium and osmium values from a concentrate containing said values as well as impurities selected from the group consisting essentially of lead, arsenic, silver, bismuth and tellurium, said process comprising (a) heating said concentrate at a temperature of between about 1100° C. and 1500° C. in a gaseous stream containing oxygen for a time sufficient to quantitatively volatilize and separate the impurities and the osmium values from said concentrate and to leave a residue containing oxidized ruthenium, rhodium and iridium values, and (b) collecting the volatilized impurities and osmium values removed by said gas stream.

2. A process as claimed in claim 1 in which the gaseous stream is air.

3. A process as claimed in claim 1 in which the heating is effected at about 1300° C.

4. A process as claimed in claim 1 in which collection is effected by scrubbing with an alkali hydroxide solution which dissolves said volatilized impurities and osmium values.

5. A process as claimed in claim 4 in which the dissolved impurities in the alkali hydroxide solution are precipitated therefrom by ethanol leaving the osmium values in solution, and after separation, the dissolved osmium values are precipitated.

6. A process as claimed in claim 1 in which the residue containing oxidized ruthenium, rhodium and iridium values is fused with potassium hydroxide, the resultant melt is solidified and leached with water to dissolve the ruthenium values to leave an insoluble residue containing the rhodium and iridium values, after separation the dissolved ruthenium values are precipitated.

7. A process as claimed in claim 6 in which the fusion is carried out at about 700° C for a period of about 90 minutes.

8. A process as claimed in claim 6 in which the insoluble residue is treated with both hydrochloric acid and hydrogen peroxide in an autoclave to dissolve rhodium and iridium values and to leave a further insoluble residue, and after separation the dissolved rhodium and iridium values are precipitated.

9. A process as claimed in claim 8 in which the autocalve is heated to about 150° C.

* * * * *